United States Patent
Brown et al.

(10) Patent No.: US 9,715,067 B1
(45) Date of Patent: Jul. 25, 2017

(54) ULTRA-COMPACT HUD UTILIZING WAVEGUIDE PUPIL EXPANDER WITH SURFACE RELIEF GRATINGS IN HIGH REFRACTIVE INDEX MATERIALS

(75) Inventors: Robert D. Brown, Lake Oswego, OR (US); Kurt A. Stahl, Portland, OR (US); Robert B. Wood, Beaverton, OR (US); Lincoln J. Burns, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 247 days.

(21) Appl. No.: 13/250,858

(22) Filed: Sep. 30, 2011

(51) Int. Cl.
*G02B 5/32* (2006.01)
*G02B 6/28* (2006.01)
*G03H 1/02* (2006.01)
*G02B 27/01* (2006.01)

(52) U.S. Cl.
CPC ....... *G02B 6/2848* (2013.01); *G02B 27/0172* (2013.01); *G03H 1/0248* (2013.01)

(58) Field of Classification Search
CPC ..... G02B 27/0172; G02B 27/01; G02B 27/10
USPC ... 359/15, 462, 569, 571, 34, 630, 576, 633; 385/37; 362/618, 622, 627
See application file for complete search history.

(56) References Cited

U.S. PATENT DOCUMENTS

| | | |
|---|---|---|
| 2,141,884 A | 12/1938 | Sonnefeld |
| 3,620,601 A * | 11/1971 | Waghorn ............... G02B 27/01 248/479 |
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |
| 4,714,320 A | 12/1987 | Banbury |
| 4,743,083 A | 5/1988 | Schimpe |
| 4,749,256 A | 6/1988 | Bell et al. |

(Continued)

FOREIGN PATENT DOCUMENTS

| | | |
|---|---|---|
| CN | 200944140 Y | 9/2007 |
| CN | 101881936 A | 11/2010 |

(Continued)

OTHER PUBLICATIONS

Cameron, A., The Application of Holographic Optical Waveguide Technology to Q-Sight™ Family of Helmet Mounted Displays, Proc. of SPIE, 2009, 11 pages, vol. 7326.

(Continued)

*Primary Examiner* — Audrey Y Chang
(74) *Attorney, Agent, or Firm* — Donna P. Suchy; Daniel M. Barbieri

(57) ABSTRACT

A head up display include an image source, and a waveguide. The waveguide has a first diffraction grating and a first end and a second diffraction grating at a second end. The waveguide is positioned as a combiner and allows viewing of an outside scene and information from the image source. The first and second diffraction gratings are surface relief gratings having a high index of modulation.

20 Claims, 4 Drawing Sheets

(56) References Cited

U.S. PATENT DOCUMENTS

| | | |
|---|---|---|
| 4,775,218 A | 10/1988 | Wood et al. |
| 4,854,688 A * | 8/1989 | Hayford ............ G02B 27/0172 359/433 |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,583,795 A | 12/1996 | Smyth |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,841,507 A | 11/1998 | Barnes |
| 5,856,842 A | 1/1999 | Tedesco |
| 5,868,951 A | 2/1999 | Schuck et al. |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,285,813 B1 | 9/2001 | Schultz et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,563,648 B2 * | 5/2003 | Gleckman .......... G02B 27/0172 359/630 |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 * | 11/2003 | Harter et al. ................. 359/630 |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,690,516 B2 | 2/2004 | Aritake et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,750,995 B2 | 6/2004 | Dickson |
| 6,757,105 B2 | 6/2004 | Niv et al. |

(56) References Cited

U.S. PATENT DOCUMENTS

| | | |
|---|---|---|
| 6,771,403 B1 | 8/2004 | Endo et al. |
| 6,776,339 B2 | 8/2004 | Piikivi |
| 6,781,701 B1 | 8/2004 | Sweetser et al. |
| 6,805,490 B2 | 10/2004 | Levola |
| 6,825,987 B2 * | 11/2004 | Repetto et al. ............... 359/633 |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 * | 4/2006 | Huck et al. ...................... 385/11 |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 * | 2/2007 | Levola ............................ 385/37 |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,286,272 B2 | 10/2007 | Mukawa |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,656,585 B1 | 2/2010 | Powell et al. |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 * | 1/2011 | Korenaga et al. ............ 359/576 |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |

(56) References Cited

U.S. PATENT DOCUMENTS

| | | |
|---|---|---|
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,159,752 B2 | 4/2012 | Wertheim et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | DeJean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 * | 7/2012 | Mukawa ............... 359/15 |
| 8,233,204 B1 | 7/2012 | Robbins et al. |
| 8,253,914 B2 | 8/2012 | Kajiya et al. |
| 8,254,031 B2 | 8/2012 | Levola |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,447,365 B1 | 5/2013 | Imanuel |
| 8,472,119 B1 | 6/2013 | Kelly |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,547,638 B2 | 10/2013 | Levola |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,639,072 B2 | 1/2014 | Popovich et al. |
| 8,643,691 B2 | 2/2014 | Rosenfeld et al. |
| 8,649,099 B2 * | 2/2014 | Schultz et al. ............ 359/630 |
| 8,654,420 B2 | 2/2014 | Simmonds |
| 8,659,826 B1 | 2/2014 | Brown et al. |
| 8,670,029 B2 | 3/2014 | Mceldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,886 B2 | 6/2014 | Gupta |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,830,588 B1 | 9/2014 | Brown et al. |
| 8,913,324 B2 | 12/2014 | Schrader |
| 8,938,141 B2 | 1/2015 | Magnusson |
| 8,964,298 B2 | 2/2015 | Haddick et al. |
| 9,097,890 B2 | 8/2015 | Miller et al. |
| 9,244,280 B1 | 1/2016 | Tiana et al. |
| 9,456,744 B2 | 10/2016 | Popovich et al. |
| 9,523,852 B1 | 12/2016 | Brown et al. |
| 2002/0012064 A1 | 1/2002 | Yamaguchi |
| 2002/0021461 A1 | 2/2002 | Ono et al. |
| 2002/0131175 A1 | 9/2002 | Yagi et al. |
| 2003/0030912 A1 | 2/2003 | Gleckman et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutherland et al. |
| 2004/0130797 A1 | 7/2004 | Leigh Travis |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 * | 6/2006 | Weiss et al. ............... 359/462 |
| 2006/0215244 A1 | 9/2006 | Yosha et al. |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2006/0291021 A1 | 12/2006 | Mukawa |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 * | 2/2009 | Amitai ............... 359/633 |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |

(56) References Cited

U.S. PATENT DOCUMENTS

| | | |
|---|---|---|
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |
| 2010/0315719 A1 | 12/2010 | Saarikko et al. |
| 2010/0321781 A1 | 12/2010 | Levola et al. |
| 2011/0013423 A1 | 1/2011 | Selbrede et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0235365 A1 | 9/2011 | McCollum et al. |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2011/0310356 A1 | 12/2011 | Vallius |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0224062 A1 | 9/2012 | Lacoste et al. |
| 2012/0235884 A1 | 9/2012 | Miller et al. |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0300311 A1 | 11/2012 | Simmonds et al. |
| 2012/0320460 A1 | 12/2012 | Levola |
| 2013/0069850 A1 | 3/2013 | Mukawa et al. |
| 2013/0093893 A1 | 4/2013 | Schofield et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0184904 A1 | 7/2013 | Gadzinski |
| 2013/0200710 A1 | 8/2013 | Robbins |
| 2013/0249895 A1 | 9/2013 | Westerinen et al. |
| 2013/0250207 A1 | 9/2013 | Bohn |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0043689 A1 | 2/2014 | Mason |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1 | 5/2014 | Brown et al. |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2014/0300966 A1 | 10/2014 | Travers et al. |
| 2015/0010265 A1 | 1/2015 | Popovich et al. |
| 2015/0167868 A1 | 6/2015 | Boncha |
| 2015/0177688 A1 | 6/2015 | Popovich et al. |
| 2015/0277375 A1 | 10/2015 | Large et al. |
| 2015/0289762 A1 | 10/2015 | Popovich et al. |
| 2015/0316768 A1 | 11/2015 | Simmonds |
| 2016/0209657 A1 | 7/2016 | Popovich et al. |

FOREIGN PATENT DOCUMENTS

| | | |
|---|---|---|
| DE | 1020060 03 785 | 7/2007 |
| EP | 0 822 441 | 2/1998 |
| EP | 2 110 701 | 10/2009 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2004-157245 | 6/2004 |
| JP | 2006-350129 A | 12/2006 |
| JP | 2007-219106 A | 8/2007 |
| WO | WO-99/52002 | 10/1999 |
| WO | WO-03/081320 A1 | 10/2003 |
| WO | WO-2006/002870 | 1/2006 |
| WO | WO-2007/130130 A2 | 11/2007 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO 2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

OTHER PUBLICATIONS

Wisely, P.L., Head up and head mounted display performance improvements through advanced techniques in the manipulation of light, Proc. of SPIE, 2009, 10 pages, vol. 7327.

Office Action for U.S. Appl. No. 13/250,621, mail date May 21, 2013, 10 pages.

Office Action for U.S. Appl. No. 13/250,940, mail date Mar. 12, 2013, 11 pages.

Office Action for U.S. Appl. No. 13/250,970, mail date Jul. 30, 2013, 4 pages.

Office Action for U.S. Appl. No. 13/250,994, mail date Sep. 16, 2013, 11 pages.

Ayras et al., Exit Pupil Expander with a Large Field of View Based on Diffractive Optics, Journal of the SID, 2009, 6 pages.

Notice of Allowance for U.S. Appl. No. 12/700,557, mail date Oct. 22, 2013, 9 pages.

Office Action for U.S. Appl. No. 12/700,557, mail date Aug. 9, 2013, 12 pages.

Office Action for U.S. Appl. No. 12/700,557, mail date Feb. 4, 2013, 11 pages.

Office Action for U.S. Appl. No. 13/250,940, mail date Aug. 28, 2013, 15 pages.

Office Action on U.S. Appl. No. 13/250,940 Dated Mar. 25, 2014, 12 pages.

Office Action on U.S. Appl. No. 13/251,087 Dated Mar. 28, 2014, 12 pages.

Final Office Action on U.S. Appl. No. 13/250,940 Dated Oct. 17, 2014, 15 pages.

Irie, Masahiro, Photochromic diarylethenes for photonic devices, Pure and Applied Chemistry, 1996, pp. 1367-1371, vol. 68, No. 7, IUPAC.

Non-Final Office Action on U.S. Appl. No. 13/864,991 Dated Oct. 22, 2014, 16 pages.

(56) References Cited

OTHER PUBLICATIONS

Office Action on U.S. Appl. No. 13/892,026 Dated Dec. 8, 2014, 19 pages.
Office Action on U.S. Appl. No. 13/892,057 Dated Nov. 28, 2014, 17 pages.
Plastic has replaced glass in photochromic lens, www.plastemart.com, 2003, 1 page.
Webster's Third New International Dictionary 433 (1986), 3 pages.
Notice of Allowance on U.S. Appl. No. 13/250,970 dated Sep. 16, 2014, 7 pages.
Notice of Allowance on U.S. Appl. No. 13/251,087 Dated Jul. 17, 2014, 8 pages.
Non-Final Office Action on U.S. Appl. No. 14/038,400 Dated Feb. 5, 2015, 18 pages.
Final Office Action in U.S. Appl. No. 13/864,991, dated Apr. 2, 2015, 16 pages.
Final Office Action on U.S. Appl. No. 13/892,057 Dated Mar. 5, 2015, 21 pages.
Non-Final Office Action on U.S. Appl. No. 13/250,940 Dated Mar. 18, 2015, 17 pages.
Amendment and Reply for U.S. Appl. No. 12/571,262, mail date Dec. 16, 2011, 7 pages.
Amitai, Y., et al. "Visor-display design based on planar holographic optics," Applied Optics, vol. 34, No. 8, Mar. 10, 1995, pp. 1352-1356.
Caputo, R. et al., Policryps Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action on U.S. Appl. No. 13/892,026 Dated Apr. 3, 2015, 17 pages.
International Preliminary Report on Patentability for PCT Application No. PCT/US2013/038070, dated Oct. 28, 2014, 6 pages.
International Search Report and Written Opinion regarding PCT/US2013/038070, mail date Aug. 14, 2013, 14 pages.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/432,662 Dated May 27, 2015, 15 pages.
Non-Final Office Action on U.S. Appl. No. 13/844,456 Apr. 1, 2015, XX Pages.
Non-Final Office Action on U.S. Appl. No. 13/869,866 Dated May 28, 2014, 16 pages.
Non-Final Office Action on U.S. Appl. No. 14/044,676 Dated Apr. 9, 2015, 13 pages.
Non-Final Office Action on U.S. Appl. No. 14/225,062 Dated May 21, 2015, 11 pages.
Nordin, G., et al., Journal of the Optical Society of America A., vol. 9, No. 12, Dec. 1992, pp. 2206-2217, 12 pages.
Office Action for U.S. Appl. No. 12/571,262, mail date Sep. 28, 2011, 5 pages.
Office Action for U.S. Appl. No. 13/355,360, mail date Sep. 12, 2013, 7 pages.
Press Release, "USAF Awards SBG Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internet at http://www.digilens.com/pr10-2012.2.php. 2 pages.
Requirement for Restriction/Election on U.S. Appl. No. 13/844,456 Dated Sep. 12, 2014, 23 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Final Office Action on U.S. Appl. No. 13/869,866 Dated Oct. 3, 2014, 17 pages.
Final Office Action on U.S. Appl. No. 14/038,400 Dated Aug. 10, 2015, 32 pages.
First office action received in Chinese patent application No. 201380001530.1, dated Jun. 30, 2015, 9 pages with English translation.
Non-Final Office Action on U.S. Appl. No. 13/869,866 Dated Jul. 22, 2015, 28 pages.
Non-Final Office Action on U.S. Appl. No. 13/892,026 Dates Aug. 6, 2015, 22 pages.
Non-Final Office Action on U.S. Appl. No. 13/892,057 dated Jul. 30, 2015, 29 pages.
Non-Final Office Action on U.S. Appl. No. 14/109,551 Dated Jul. 14, 2015, 32 pages.
Non-Final Office Action on U.S. Appl. No. 14/168,173 Dated Jun. 22, 2015, 14 pages.
Notice of Allowance on U.S. Appl. No. 13/355,360 Dated Apr. 10, 2014, 7 pages.
Office Action, U.S. Appl. No. 10/696,507, mailed on Nov. 13, 2008 (CTX-290US), 15 pages.
Final Office Action on U.S. Appl. No. 13/892,026 dated Nov. 20, 2015, 25 pages.
Final Office Action on U.S. Appl. No. 13/892,057 dated Nov. 20, 2015, 30 pages.
Final Office Action on U.S. Appl. No. 14/152,756, dated Dec. 21, 2015, 15 pages.
Non-Final Office Action on U.S. Appl. No. 14/465,763, dated Nov. 19, 2015, 4 pages.
Notice of Allowance on U.S. Appl. No. 14/225,062, dated Dec. 2, 2015, 10 pages.
Non-Final Office Action on U.S. Appl. No. 14/152,756, mail date Aug. 25, 2015, 39 pages.
Non-Final Office Action on U.S. Appl. No. 13/844,456, dated Jan. 15, 2016, 16 Pages.
Non-Final Office Action on U.S. Appl. No. 14/044,676, dated Jan. 20, 2016, 21 pages.
Notice of Allowance for U.S. Appl. No. 14/109,551, dated Nov. 20, 2015, 8 pages.
Non-Final Office Action on U.S. Appl. No. 13/892,057, dated May 16, 2016, 23 pages.
Extended European Search Report for European Application No. 13765610.4 dated Feb. 16, 2016, 6 pages.
Final Office Action on U.S. Appl. No. 14/168,173, dated Nov. 4, 2015, 10 pages.
Non-Final Office Action on U.S. Appl. No. 13/864,991 dated Nov. 30, 2015, 18 pages.
Non-Final Office Action on U.S. Appl. No. 13/892,026 dated Mar. 22, 2016, 16 pages.
Non-Final Office Action on U.S. Appl. No. 14/152,756, dated Apr. 26, 2016, 17 pages.
Non-Final Office Action on U.S. Appl. No. 14/168,173 dated Mar. 10, 2016, 9 pages.
Non-Final Office Action on U.S. Appl. No. 14/260,943 dated Feb. 3, 2016, 19 pages.
Notice of Allowance on U.S. Appl. No. 13/432,662, dated Feb. 18, 2016, 10 pages.
Final Office Action on U.S. Appl. No. 13/864,991, dated Jun. 27, 2016, 16 pages.
Final Office Action on U.S. Appl. No. 14/044,676, dated Aug. 12, 2016, 23 pages.
Final Office Action on U.S. Appl. No. 14/260,943, dated Jul. 19, 2016, 23 pages.
Non-Final Office Action on U.S. Appl. No. 13/844,456, dated Aug. 16, 2016, 18 pages.
Non-Final Office Action on U.S. Appl. No. 14/465,763, dated Sep. 29, 2016, 4 pages.
Non-Final Office Action on U.S. Appl. No. 14/497,280, dated Sep. 22, 2016, 15 pages.

(56) References Cited

OTHER PUBLICATIONS

Non-Final Office Action on U.S. Appl. No. 14/820,237, dated Aug. 5, 2016, 14 pages.
Chinese Office Action issued in corresponding application No. 201310557623 dated Jan. 17, 2017.
Final Office Action on U.S. Appl. No. 14/152,756, dated Oct. 12, 2016, 18 pages.
Non-Final Office Action on U.S. Appl. No. 13/844,456, with English translation, dated Dec. 29, 2016, 24 pages.
Non-Final Office Action on U.S. Appl. No. 14/044,676, dated Dec. 29, 2016, 26 pages.
Non-Final Office Action on U.S. Appl. No. 15/005,507, dated Nov. 22, 2016, 7 pages.
Notice of Allowance on U.S. Appl. No. 13/892,057, dated Nov. 8, 2016, 10 pages.
Notice of Reasons for Rejection for Japanese Application No. 2015-509120, dated Nov. 1, 2016, 4 pages.
US Notice of Allowance on U.S. Appl. No. 14/820,237 dated Jan. 23, 2017.

* cited by examiner

ULTRA-COMPACT HUD UTILIZING WAVEGUIDE PUPIL EXPANDER WITH SURFACE RELIEF GRATINGS IN HIGH REFRACTIVE INDEX MATERIALS

CROSS REFERENCE TO RELATED APPLICATIONS

The present application is related to: U.S. patent application Ser. No. 13/250,940, entitled, "Head Up Display (HUD) Utilizing Diffractive Gratings Having Graded Efficiency," filed on an even date herewith, incorporated herein by reference, and assigned to the assignee of the present application; U.S. patent application Ser. No. 13/251,087, now U.S. Pat. No. 8,903,207, entitled, "System For and Method of Extending Vertical Field of View in Head Up Display Utilizing a Waveguide Combiner," filed on an even date herewith, incorporated herein by reference in its entirety, and assigned to the assignee of the present application; U.S. patent application Ser. No. 13/250,970, now U.S. Pat. No. 8,937,772, entitled, "System for and Method of Stowing HUD Combiners," filed on an even date herewith, incorporated herein by reference in its entirety, and assigned to the assignee of the present application; U.S. patent application Ser. No. 13/250,994, now U.S. Pat. No. 8,749,890, entitled, "Compact Head Up Display (HUD) for Cockpits with Constrained Space Envelopes," filed on an even date herewith, incorporated herein by reference in its entirety, and assigned to the assignee of the present application; and U.S. patent application Ser. No. 13/250,621, now U.S. Pat. No. 8,634,139, entitled, "System for and Method of Catadioptric Collimation in a Compact Head Up Display (HUD)," filed on an even date herewith, incorporated herein by reference herein in its entirety and assigned to the assignee of the present application.

BACKGROUND OF THE INVENTION

The present specification relates to displays. More particularly, the present specification relates to head up displays (HUDs).

Conventional HUDs are generally large, expensive and difficult to fit into small airplanes. Often, conventional HUDs rely on large lenses to form adequate field of view and viewing eye box. Compact HUDs are needed for small business jets and other aircraft where space is constrained in the cockpit.

Substrate guided HUDs have been proposed which use waveguide technology with diffraction gratings to preserve eye box size while reducing lens size. U.S. Pat. No. 4,309,070 issued St. Leger Searle and U.S. Pat. No. 4,711,512 issued to Upatnieks disclose substrate guided HUDS. However, such systems have faced difficulties in design. For example, diffraction gratings based upon holographic materials can be difficult to process consistently. Holograms are generally extremely angle- and wavelength-sensitive because they rely on low index modulation throughout a thick volume ($\Delta n<0.05$), where the required phase shift for diffraction can only be met for a small set of wavelengths and angles. Diffraction gratings fabricated using embossing and casting processes are more repeatable but can be limited to organic low refractive index materials, thereby limiting the field of view and spectral range. Diffraction gratings that have mechanically reproduced gratings (ruled gratings) often do not achieve the required resolution for HUD applications.

Therefore, there is a need for diffraction gratings optimized for HUD applications. Yet further, there is need a substrate waveguide HUD including diffraction gratings that meet performance and cost requirements. Still further, there is a need for a HUD including substrate waveguide with diffraction gratings that can be fabricated with sufficient repeatability on a substrate material with acceptable optical characteristics. Yet further, there is a need for a HUD substantive including high index of refraction substantive waveguide with diffraction ratings that enables wide field of view and acceptable luminance.

SUMMARY OF THE INVENTION

An exemplary embodiment relates to a head up display including an image source, and a waveguide. The waveguide has a first diffraction grating at a first end and a second diffraction grating at a second end. The waveguide is positioned as a combiner and allows viewing of an outside scene and information from the image source. The first diffraction grating and the second diffraction grating are surface relief gratings having a high refractive index modulation.

Another exemplary embodiment relates to a method of providing information to a pilot. The method includes providing light associated with the information through a first lens to an input of a substrate waveguide. The method also includes diffracting the light at the input of the waveguide into the waveguide using a surface relief grating and diffracting the light out of the waveguide at an output of the waveguide using a second surface relief grating. The waveguide has a high index of refraction.

Another embodiment relates to an optical system for a head up display including an image source. The optical system includes a combiner. The combiner is disposed to receive light from the image source. The combiner is a waveguide including surface relief diffraction gratings etched into inorganic high index of refraction material of the substrate waveguide.

BRIEF DESCRIPTION OF THE DRAWINGS

Exemplary embodiments are hereafter described with reference to the accompanying drawings, wherein like numerals denote like elements; and.

DETAILED DESCRIPTION OF THE PREFERRED EMBODIMENTS

Figure 1:
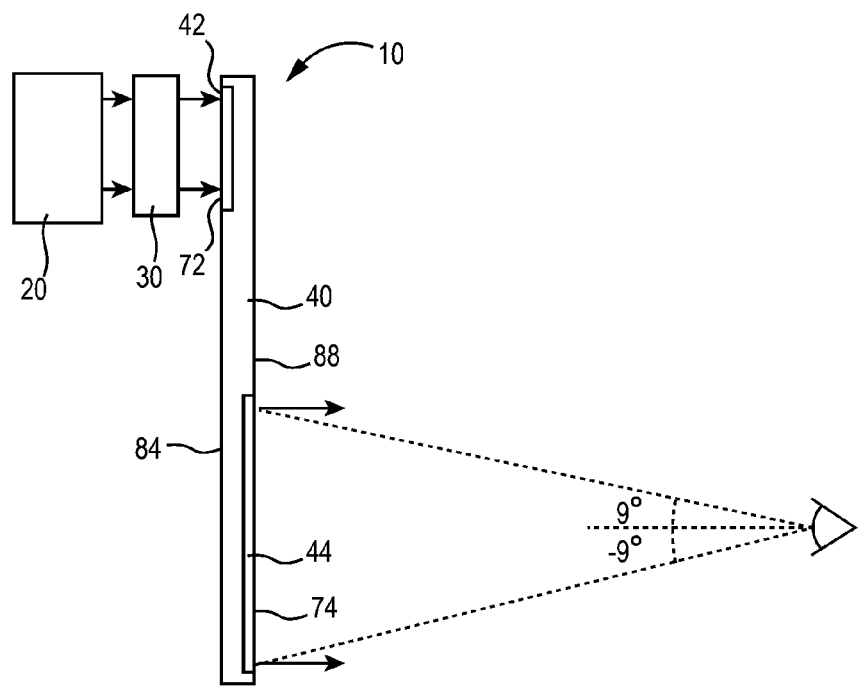
FIG. 1 is a general block diagram of a head up display (HUD) system in accordance with an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, head up display (HUD) system 10 can be utilized in various applications, including aviation, medical, naval, targeting, ground based, military, etc. HUD system 10 is preferably configured for use in smaller cockpit environments and yet provides an appropriate field of view and eye box for avionic applications.

HUD system 10 preferably includes an image source 20 and a substrate waveguide 40. Image source 20 can be any device for providing an image including but not limited to a CRT display, an LED display, an active matrix liquid crystal display (LCD), etc. In a preferred embodiment, image source 20 is a micro LCD assembly and can provide linearly polarized light.

In addition, system 10 can include collimating optics 30 disposed between substrate waveguide 40 and image source 20. Collimating optics 30 can be a single optical component, such as a lens, or include multiple optical components. In one embodiment, collimating optics 30 are configured as a catadioptric collimator as described with reference to FIG. 6. Collimating optics 30 can be any optical component or configuration of optical components that provide light (preferably collimated light) from image source 20 to substrate waveguide 40. Collimating optics 30 can be integrated with or spaced apart from image source 20 and/or substrate waveguide 40.

In operation, system 10 provides images from image source 20 to a pilot or other operator so that the pilot can simultaneously view the images and a real world scene. The images can include graphic and/or text information (e.g., flight path vector, etc.) related to avionic information in one embodiment. In addition, the images can include synthetic or enhanced vision images. In one embodiment, collimated light representing the image from image source 20 is provided on substrate waveguide 40 so that the pilot can view the image conformally on the real world scene through substrate waveguide 40. Waveguide 40 is preferably transparent for viewing the real world scene through main surfaces or sides 84 and 88.

Figure 3:
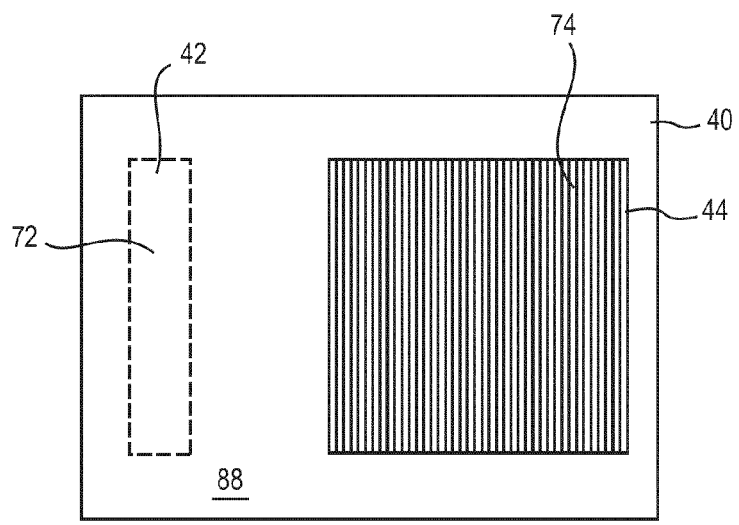
FIG. 3 is a top view schematic drawing of a waveguide for the system illustrated in FIG. 1 in accordance with yet another exemplary embodiment.

With reference to FIGS. 1 and 3, waveguide 40 includes an input diffraction grating 42 and an output diffraction grating 44. Gratings 42 and 44 can be a gradient output coupling grating that provides excellent image quality and acceptable brightness in a preferred embodiment. Gratings 42 and 44 are preferably implemented as surface relief gratings in a high refractive index (e.g., N>1.6) dielectric materials, thereby enabling wider field of view with acceptable luminance. Gratings 42 and 44 can be implemented according to a number of techniques. In a preferred embodiment, gratings 42 and 44 are surface relief gratings fabricated using lithographic mastering in a wafer foundry.

Applicants have found that surface relief gratings formed by lithographic mastering can have better performance in avionic HUD applications over holographic gratings. Surface relief gratings can be formed in high refractive index materials, such as, inorganic glass materials, thereby enabling wide field of view with acceptable luminescence. Holographic gratings can have disadvantages related to angle dependency and wavelength sensitivity because such gratings often rely on low index modulation throughout a thick volume ($\Delta N$ is less than 0.05). In contrast to holographic gratings, surface relief gratings have much broader angular and spectral acceptance because the surface relief gratings can be extremely thin and use very high index modulations ($\Delta N$ equal to approximately 0.6-0.7), thereby satisfying the phase shift over a broad spectrum and angular range.

In a preferred embodiment, gratings 42 and 44 are etched directly in an inorganic high index material (e.g., glass material having refractive index of diffraction, $N \geq 1.5$) using reactive ion etching (RIE). This replication can utilize a step and repeat process with less than 100 nanometers repeatability.

Substrate waveguide 40 can be a single glass plate 78 or can be made from two or more fixed glass plates. Substrate waveguide 40 can have a variety of shapes including generally rectangular, oval, circular, tear drop-shaped, hexagonal, rectangular with rounded corners, square-shaped, etc.

In operation, substrate waveguide 40 advantageously receives light from image source 20 provided through collimating optics 30 at an input 72 and provides light to a user at its output 74. Image source 20 provides information using a single color of light (e.g., green light with a approximately between 500 and 550 nanometers (nm)). Light provided to substrate waveguide 40 is preferably linearly or S polarized and collimated. Alternatively, other polarization, multiple colors, or other colors at different wavelengths can be utilized without departing from the scope of the invention.

Substrate waveguide 40 preferably performs two operations in a preferred embodiment. First, substrate waveguide 40 is disposed to provide a medium for transporting light by total internal reflection from input 72 to output 74. Light is reflected multiple times off of opposing main sides 84 and 88 of substrate 40 as it travels from input 72 to output 74. Second, substrate waveguide 40 operates as a combiner allowing the user to view the light from image source 20 at output 74 and light from the real world scene through sides 84 and 88.

Light from collimating optics 30 first strikes diffraction grating 42 at input 72 on side 84 of substrate waveguide 40. Grating 40 diffracts light toward the length of substrate 40 so that it travels by total internal reflection to output 74 on side 84. At output 74, diffraction grating 44 diffracts the light toward the user and out of the substrate waveguide 40. Diffraction grating 42 at input 72 preferably has a greater efficiency than diffraction grating 44 at output 74. In one example, grating 42 has an efficiency of as high as possible (e.g., 50 percent or greater) and grating 44 has an efficiency low enough to provide a uniform image across output 74.

Figure 2:
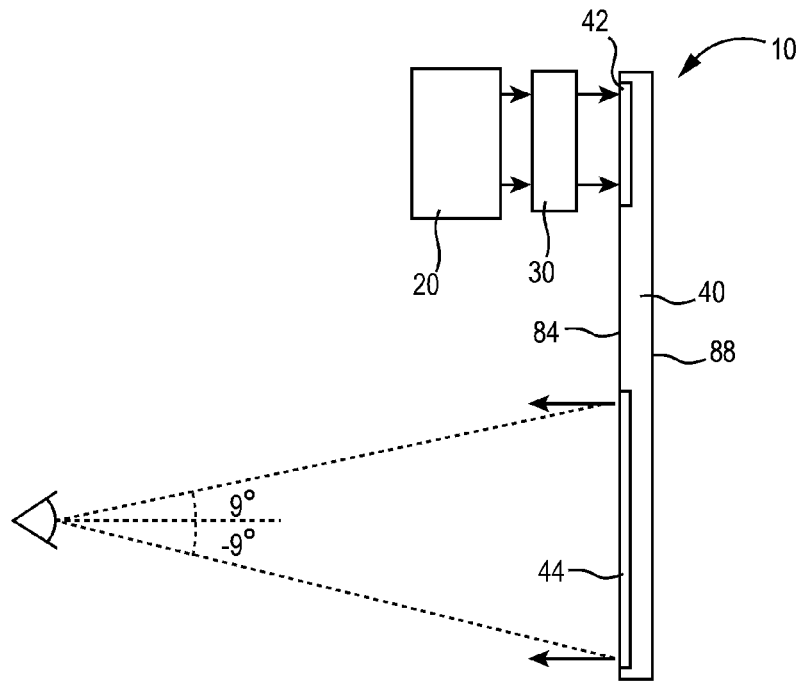
FIG. 2 is a general block diagram of a HUD system in accordance with another exemplary embodiment.

With reference to FIG. 1, diffraction gratings 42 and 44 are disposed on respective opposing sides 84 and 88 of substrate waveguide 40 in one embodiment. With reference to FIG. 2, gratings 42 and 44 can also be formed on the same side 84 of waveguide 40 in one alternative embodiment.

With reference to FIG. 3, a single glass plate 78 of inorganic glass material is utilized for substrate waveguide 40. The thickness of glass material is dependent upon field of view and parameters associated with collimating optics 30. Gratings 42 and 44 are surface relief gratings directly formed on respective sides 84 and 88 according to one embodiment.

With reference to FIG. 3, diffraction gratings 42 and 44 are preferably disposed in respective areas that are rectangular in shape and have the same width as each other in one embodiment. Alternatively, gratings 42 and 44 can have different widths. Grating 44 has a greater height than grating 42 in one embodiment.

Gratings 42 and 44 preferably have a period of 330 nm (plus or minus 20 percent) nanometers. Grating 42 preferably has a trench depth of 100-150 nm, and grating 44 has a trench depth of 50-100 nm in one embodiment. Both gratings 44 and 42 preferably have a 40-70% duty cycle.

Figure 4:
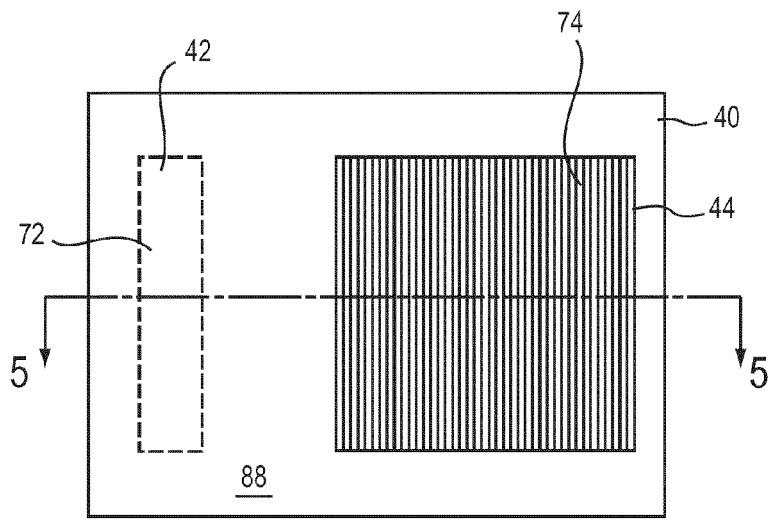
FIG. 4 is a top view schematic drawing of a waveguide for the system illustrated in FIG. 1 in accordance with still another exemplary embodiment.
Figure 5:
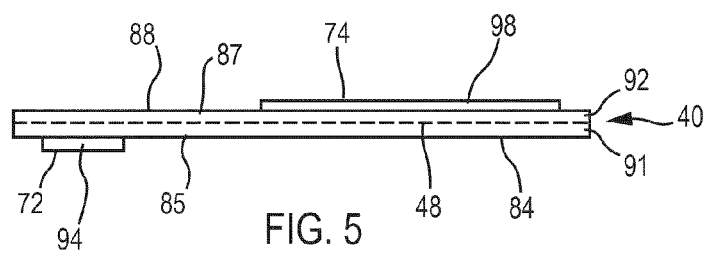
FIG. 5 is a cross sectional view schematic drawing of the waveguide illustrated in FIG. 4 along line 5-5.

With reference to FIGS. 4 and 5, substrate waveguide 40 can be made from two equal sized glass plates 91 and 92 adhered together by optical adhesive or contact bond in one embodiment. Glass plates 78, 91 and 92 can be rectangular in cross-sectional area.

With reference to FIGS. 4 and 5, diffraction gratings 42 and 44 are preferably disposed in respective areas that are rectangular in shape with the same width as each other in one embodiment. Grating 44 preferably has a pitch of 330 nanometers and a trench depth of 60 nanometers in one embodiment. Both gratings 40 and 42 preferably have a 50% duty cycle and are disposed on wafers 94 and 98. Plates 91 and 92 can be approximately 2-10 millimeters thick.

With reference to FIG. 5, diffraction gratings 42 and 44 can be formed on fused silica wafers 94 and 98 that are adhered to respective outside surfaces 85 and 87 of plates 84 and 88 using optical adhesive or contact bond according to one embodiment. In one embodiment, a beam splitting coating 48 is disposed between plates 91 and 92 (FIG. 5) and is parallel to the major external surfaces 84 and 88 of plates 91 and 92. Beam splitting coating 48 increases the number of rays propagating toward output 74 in a preferred embodiment. Alternatively, wafers 94 and 98 can be attached to a single glass plate, such as, plate 78 (FIG. 3). Alternatively, the gratings can be formed directly on surfaces 88 and 85.

In one preferred embodiment, system 10 is configured to expand the pupil of system 10 in a single axis (e.g., in the vertical direction). In one embodiment, substrate waveguide 40 provides an approximately 100 mm vertical×75 mm horizontal exit pupil. Waveguide 40 can effect the single axis pupil expansion. The single axis expansion can be on the order of 3 to 8 times (e.g, approximately 5.8 times in one preferred embodiment). Other orders of pupil expansion are possible depending upon performance criteria, design parameters, and optical components utilized without departing from the scope of the invention.

Figure 6:
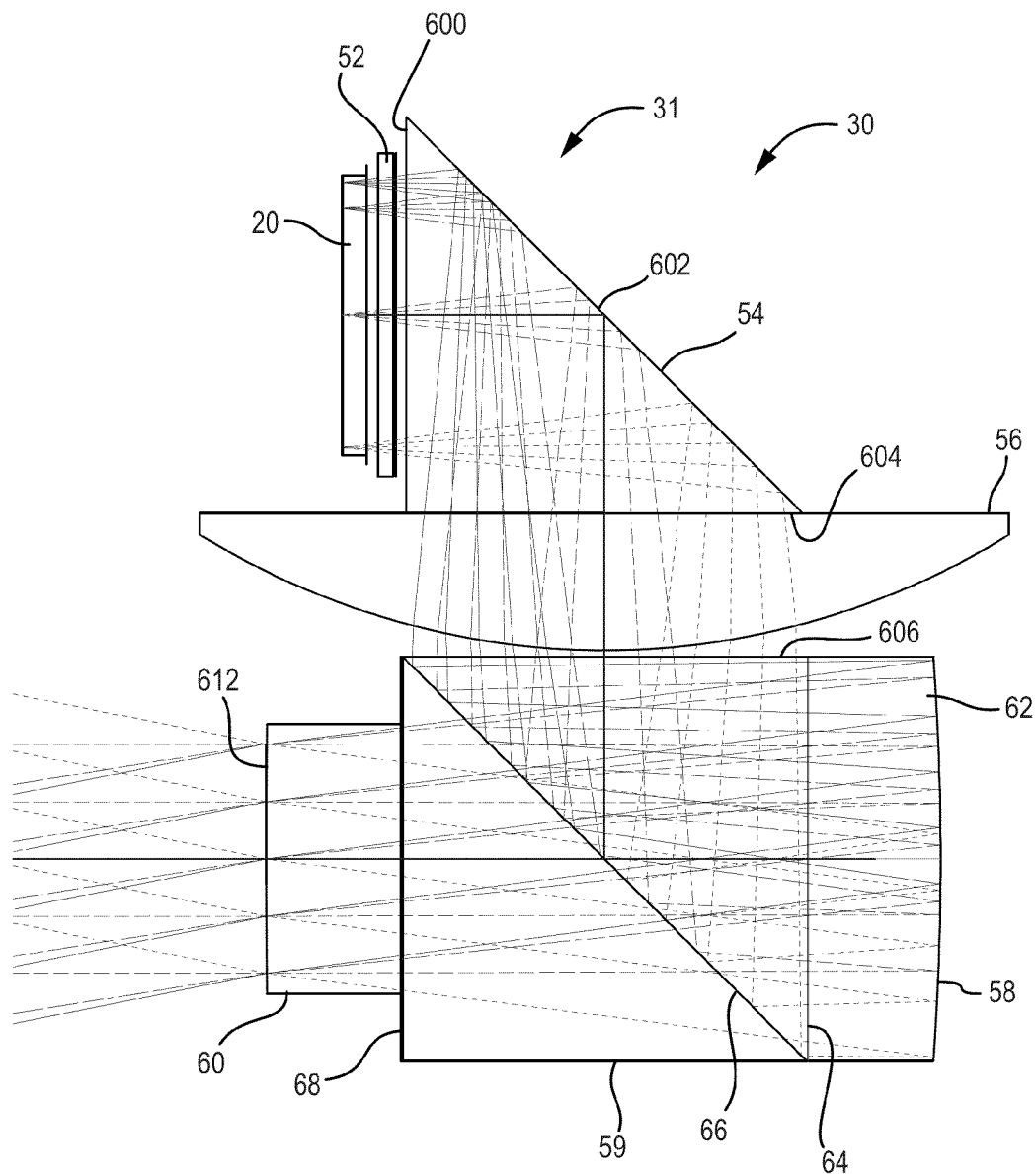
FIG. 6 is a side view schematic drawing of collimating optics for the system illustrated in FIG. 1 in accordance with another exemplary embodiment.

With reference to FIG. 6, collimating optics 30 can be an assembly 31 disposed adjacent to image source 20 in accordance with one embodiment. Assembly 31 of collimating optics 30 is preferably a catadioptric folded collimator system and includes a fold prism 54, a field lens 56, a beam splitter 59, a curved mirror 58 and a corrective lens 60. Corrective lens 60 is disposed to provide collimated light to diffraction grating 42 (FIG. 1). Fold prism 54 receives polarized light from image source 20 at a face 600. An element 52 is disposed next to the face 600.

The light received at face 600 from image source 20 is bounced by total internal reflection off a surface 602 of prism 54 to an exit surface 604. Exit surface 604 is disposed to provide light to field lens 56. Field lens 56 provides light to an input surface 606 of beam splitter 59. Field lens 56 is preferably configured as a field flattener lens, such as a plano-convex spherical lens. Alternatively, fold prism 54 can be a mirror or include a mirrored surface. In alternative embodiment, fold prism 54 is not required for assembly 51 and lens 64 system. Corrective lens 60 is preferably an aspheric lens.

In one embodiment, collimating optics 30 can provide a 30 degree field of view from image source 20 embodied as a 1.3 inch diagonal LCD which translates into a focal length of approximately 2 inches. Exit pupil 612 is preferably wide enough to allow biocular viewing (e.g., approximately 3 inches which forces the F ratio to be approximately 0.67 or ⅔). In one embodiment, optics 30 provide a field of view of 30 degrees horizontally by 18 degrees vertically. An exemplary exit aperture for optics 30 is rectangular having dimensions of 4 inches×1 inch which can be extended to be 4 inches by 4 inches by waveguide 40. Assembly 31 of collimating optics 30 advantageously provides excellent performance, meeting requirements for efficiency, color correction and collimation accuracy.

In one embodiment, exit pupil 612 from lens 60 is truncated to 17 millimeters vertical by 75 millimeters horizontal. This truncation allows system 10 to be folded into a very compact volume. Advantageously, substrate waveguide 40 provides pupil expansion in one direction to achieve a 100 millimeter vertical by 75 millimeter horizontal pupil in one embodiment. Assembly 31 preferably has a cross section that is only approximately 50 millimeters×70 millimeters in one embodiment.

Figure 7:
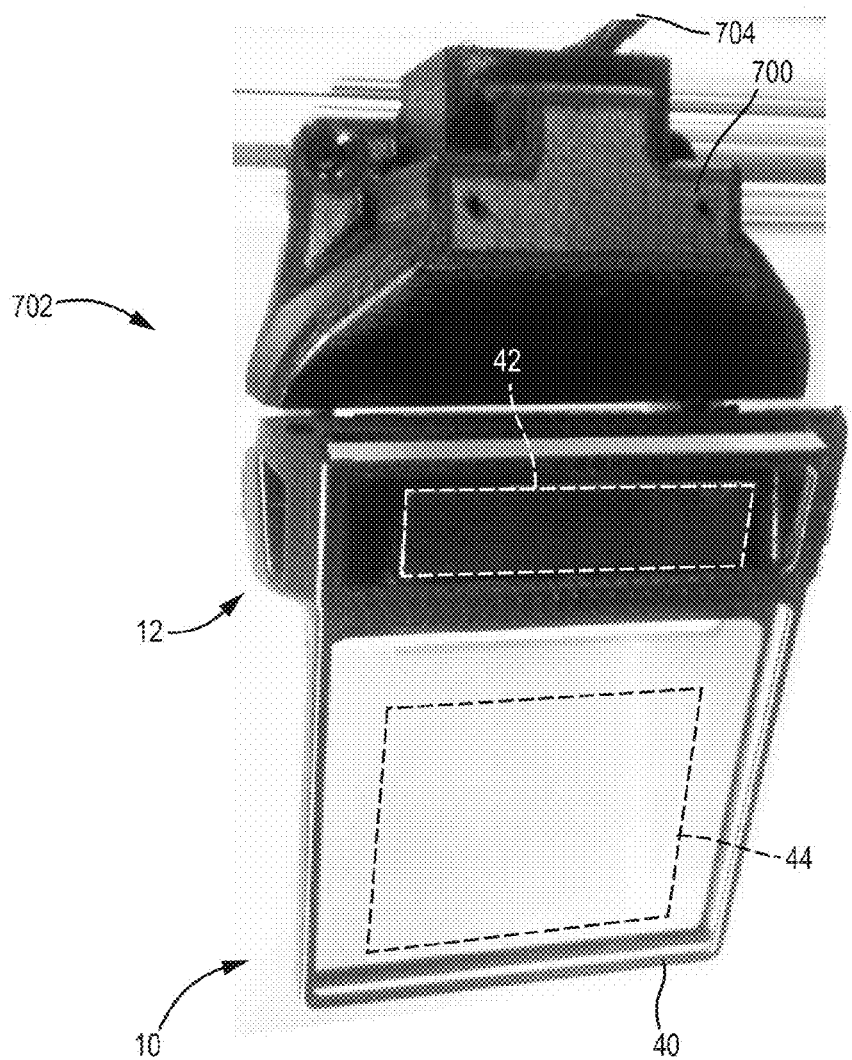
FIG. 7 is a perspective view schematic illustration of an embodiment of the HUD system illustrated in FIG. 1 and attached to a bracket in accordance with another exemplary embodiment.

With reference to FIG. 7, HUD system 10 can be packaged as a compact HUD system 702 including substrate waveguide 40 and a fixed bracket 700. Bracket 700 includes a portion including image source 20, and optical components of collimating optics 30. Bracket 700 also includes a portion 702 including the remaining optical components in collimating optics 30. Image source 20 receives data from a HUD computer via wiring 704 associated with bracket 700. Bracket 700 can be coupled to the frame of a cockpit. The specific shape and structure of system 702 is not shown in a limiting fashion.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Various changes may be made to the details disclosed without departing from the spirit of the invention which is defined by the following claims.

What is claimed is:

1. A head up display, comprising:
   an image source;
   a folded catadioptric collimator comprising a fold prism receiving light from the image source, a field lens receiving light from the fold prism, and a beam splitter receiving light from the field lens and redirecting light to a curved reflector, the curved reflector providing collimated light through the beam splitter to an exit surface on the beam splitter, wherein the folded catadioptric collimator is configured to a have a light path from the image source to the exit surface on the beam splitter, the light path having a single bounce within the fold prism as the light travels from the image source to the field lens, wherein the fold prism receives the light directly from the image source;
   a bracket; and
   a waveguide attached to a planar surface of the bracket, the waveguide having a first diffraction grating at a first end for receiving the collimated light at the exit surface and a second diffraction grating at a second end, the first diffraction grating being an input diffraction grating and the second diffraction grating being an output diffraction grating and the waveguide being positioned as a combiner and allowing viewing of an outside scene and information from the image source, the waveguide having a high index of refraction of greater than 1.6, wherein the first diffraction grating and the second diffraction grating have a period of 330 nm plus or minus 20 percent, wherein the waveguide provides single axis pupil expansion, the single axis pupil expansion provided by the waveguide being on the order of 3 to 8 times, wherein the waveguide comprises a first plate and a second plate and a beam splitting coating disposed between the first plate and the second plate along a line defined by the first plate and the second plate, the line disposed between the first diffraction grating and the second diffraction grating and parallel to main surfaces of the first diffraction grating and the second diffraction grating, the beam splitting coating being configured to cause light entering the waveguide from the image source and traveling from the first diffraction grating to the second diffraction grating via the first and second plates by total internal reflection between the main surfaces to have an increased number of rays propagating to the second diffraction grating.

2. The head up display of claim 1, wherein the folded catadioptric collimator is disposed adjacent the image source and provides the collimated light to the first diffraction grating.

3. The head up display of claim 2, wherein the waveguide is a non-organic material.

4. The head up display of claim 1, wherein the image source is an active matrix liquid crystal display.

5. The head up display of claim 1, wherein the first and second diffraction gratings are etched into the waveguide.

6. The head up display of claim 1, wherein the waveguide has an index of refraction of 1.7 or more.

7. The head up display of claim 1, the first diffraction grating has an area smaller than an area of the second diffraction grating and being located at a position to receive light from the image source.

8. The head up display of claim 7, wherein the first plate and the second plate are equal sized.

9. The head up display of claim 7 wherein the bracket has a same width as the waveguide.

10. The head up display of claim 1, wherein the first diffraction grating has a greater efficiency than the second diffraction grating.

11. A method of providing information to a pilot, the method comprising:
providing light associated with the information from an image source using a folded catadioptric collimator comprising a fold prism receiving light from the image source, a field lens receiving light from the fold prism, a beam splitter receiving light from the field lens and redirecting light to a curved reflector, the curved reflector providing collimated light through the beam splitter to an exit surface on the beam splitter, wherein the substrate waveguide is part of a fixed head up display configuration, wherein the folded catadioptric collimator is configured to a have a light path from the image source to the exit surface on the beam splitter, the light path having a single bounce within the fold prism as the light travels from the image source to the field lens, wherein the fold prism receives the light directly from the image source; and
diffracting the collimated light at an input of the substrate waveguide using a first surface relief grating into the waveguide and diffracting the light out of the waveguide using a second surface relief grating at an output of the waveguide, wherein the substrate waveguide has a high index of refraction greater than 1.6, and wherein the substrate waveguide comprises a first plate and a second plate, wherein the first plate and the second plate are of equal size.

12. The method of claim 11, wherein the first surface relief grating is etched into the waveguide.

13. The method of claim 11, wherein the surface relief gratings are lithographically formed.

14. The method of claim 11, wherein the waveguide is a combiner.

15. The method of claim 11, wherein the input and output are on the same side of the waveguide.

16. An optical system for a head up display including an image source, the optical system comprising:
a combiner, wherein the combiner is positioned to receive light from an image source, wherein the combiner is a waveguide including surface relief diffraction gratings etched into high index of refraction inorganic material, the waveguide having a high index of refraction of greater than 1.6, a first grating of the surface relief diffraction gratings being an input grating and a second grating of the surface relief diffraction gratings being an output grating; and
a folded catadioptric collimator disposed adjacent the first grating, wherein the folded catadioptric collimator provides the light to the first grating, the folded catadioptric collimator having a rectangular exit pupil having dimensions of 4 units by 1 unit, the rectangular exit pupil being extended to dimensions of 4 units by 4 units by the combiner, wherein the folded catadioptric collimator comprises a fold prism receiving light from the image source, a field lens receiving light from the fold prism, a beam splitter receiving light from the field lens and redirecting light to a curved reflector, the curved reflector providing collimated light through the beam splitter to an exit surface of the beam splitter for receipt by the input grating, wherein the field lens is disposed at an output face of the fold prism, wherein the folded catadioptric collimator is configured to a have a light path from the image source to the exit surface on the beam splitter, the light path having a single bounce within the fold prism as the light travels from the image source to the field lens, wherein the fold prism receives the light directly from the image source.

17. The system of claim 16, wherein the combiner is a substrate waveguide.

18. The system of claim 17, wherein a period of the surface relief gratings is 330 nm plus or minus 20 percent and the duty cycle of the surface relief gratings is between 40 and 70 percent.

19. The system of claim 16, wherein the folded catadioptric collimator is disposed in a bracket attached to the waveguide.

20. The system of claim 16, wherein the surface relief gratings are provided on wafers adhered to the combiner.

* * * * *